Nov. 7, 1967  G. K. LARGER  3,350,833
BRICK LAYING APPARATUS

Filed Feb. 3, 1966  11 Sheets-Sheet 1

*INVENTOR.*
GEORGE K. LARGER
BY
*Schmieding & Sielts*
ATTORNEYS

Nov. 7, 1967  G. K. LARGER  3,350,833
BRICK LAYING APPARATUS
Filed Feb. 3, 1966  11 Sheets-Sheet 3

INVENTOR.
GEORGE K. LARGER

BY
*Schmieding & Fultz*

ATTORNEYS

Nov. 7, 1967

G. K. LARGER 3,350,833

BRICK LAYING APPARATUS

Filed Feb. 3, 1966

INVENTOR.
GEORGE K. LARGER

BY
Schmeding & Fultz
ATTORNEYS

Nov. 7, 1967 G. K. LARGER 3,350,833
BRICK LAYING APPARATUS
Filed Feb. 3, 1966 11 Sheets-Sheet 5

FIG. 12

INVENTOR.
GEORGE K. LARGER
BY
Schmieding & Sultz
ATTORNEYS

Nov. 7, 1967    G. K. LARGER    3,350,833
BRICK LAYING APPARATUS
Filed Feb. 3, 1966    11 Sheets-Sheet 6

FIG. 13

INVENTOR.
GEORGE K. LARGER
BY
Schmieding & Fultz
ATTORNEYS

Nov. 7, 1967  G. K. LARGER  3,350,833
BRICK LAYING APPARATUS
Filed Feb. 3, 1966  11 Sheets-Sheet 8

INVENTOR.
GEORGE K. LARGER
BY
Schmieding & Fultz
ATTORNEYS

Nov. 7, 1967  G. K. LARGER  3,350,833
BRICK LAYING APPARATUS
Filed Feb. 3, 1966  11 Sheets-Sheet 9

INVENTOR.
GEORGE K. LARGER
BY
Schmieding & Sultz
ATTORNEYS

Nov. 7, 1967  G. K. LARGER  3,350,833
BRICK LAYING APPARATUS
Filed Feb. 3, 1966  11 Sheets-Sheet 10

FIG. 20

INVENTOR.
GEORGE K. LARGER
BY
Schnieding & Fultz
ATTORNEYS

FIG. 21

INVENTOR
GEORGE K. LARGER

United States Patent Office 3,350,833
Patented Nov. 7, 1967

3,350,833
BRICK LAYING APPARATUS
George K. Larger, 2744 Gantz Road,
Grove City, Ohio 43123
Filed Feb. 3, 1966, Ser. No. 524,892
11 Claims. (Cl. 52—749)

The present invention relates generally to brick laying apparatus and particularly to a novel improved apparatus for laying masonry units, such as bricks, cement blocks, or glazed tile and the like.

In general, the apparatus for laying masonry units of the present invention comprises a frame means which supports a movably mounted hopper, a conveyor, and an elevating platform upon which the units are laid to form a wall panel. The movable hopper includes means for delivering a predetermined amount of mortar upon the units which are carried from the conveyor to the platform by engagement means mounted on the hopper.

In accordance with the present invention, a wall panel may be constructed for pre-fabrication uses to provide a much quicker and economical method of construction than prior methods and means.

As another aspect of the present invention, the apparatus as a whole operates from a stationary position and the hopper moves on the frame only a relatively short distance between the conveyor which feeds masonry units and the platform upon which said units are laid. After a wall panel is completed it may be removed from the platform and conveniently stored for later use or immediately transported to a construction site.

As another aspect of the present invention, the hopper and associated engagement means permits a single course of masonry units to be simultaneously laid to form a wall panel of any desired width within practical physical limitations.

As another aspect of the present invention the movable hopper is mounted on a rail or track forming part of the frame by means of spring biased rollers to prevent accidental disengagement of said rollers from said rail.

As still another aspect of the present invention the conveyor which delivers the units to the hopper and the guide means for aligning the units on the elevating platform are readily adjustable to permit the same apparatus to lay different sizes of masonry units.

It is, therefore, an object of the present invention to provide an apparatus of the type described which permits masonry unit wall panels for prefabrication uses to be laid in a faster, more efficient, and more economical manner than prior methods and means.

It is another object of the present invention to provide an apparatus of the type described wherein the apparatus as a whole operates from a stationary position remote from the final construction site. This feature permits mass production from one site to supply pre-fabricated wall panels for immediate use or for inventory purposes.

It is another object of the present invention to provide an apparatus of the type described which permits a single course of masonry units of any desired width, within physical limitations, to be laid simultaneously.

It is another object of the present invention to provide an apparatus of the type described which may be conveniently operated in a relatively simple manner to permit operation by semi-skilled persons thereby reducing labor costs.

It is still another object of the present invention to provide an apparatus of the type described which is readily adaptable to permit any type or size of masonry unit to be laid using the same apparatus.

Further objects and advantages of the present invention will be apparent from the following description, reference being had to the accompanying drawings wherein a preferred form of embodiment of the invention is clearly shown.

In the drawings:

FIG. 1 is a partial side elevational view in section of a portion of the apparatus of the present invention illustrating the hopper and the means for delivering a predetermined amount of mortar from the hopper;

FIG. 1-A is a partial front view of that portion of the present invention shown in FIG. 1 illustrating the gauge used to indicate the amount of mortar to be discharged;

FIG. 2 is a view similar to the view shown in FIG. 1 except that the engagement means for picking up and depositing bricks or blocks is illustrated in detail;

FIG. 2-A is a partial side elevational view of the hopper shown in FIGS. 1 and 2 illustrating the novel spring biased rollers which movably mount the hopper to the supporting frame;

Figure 12:
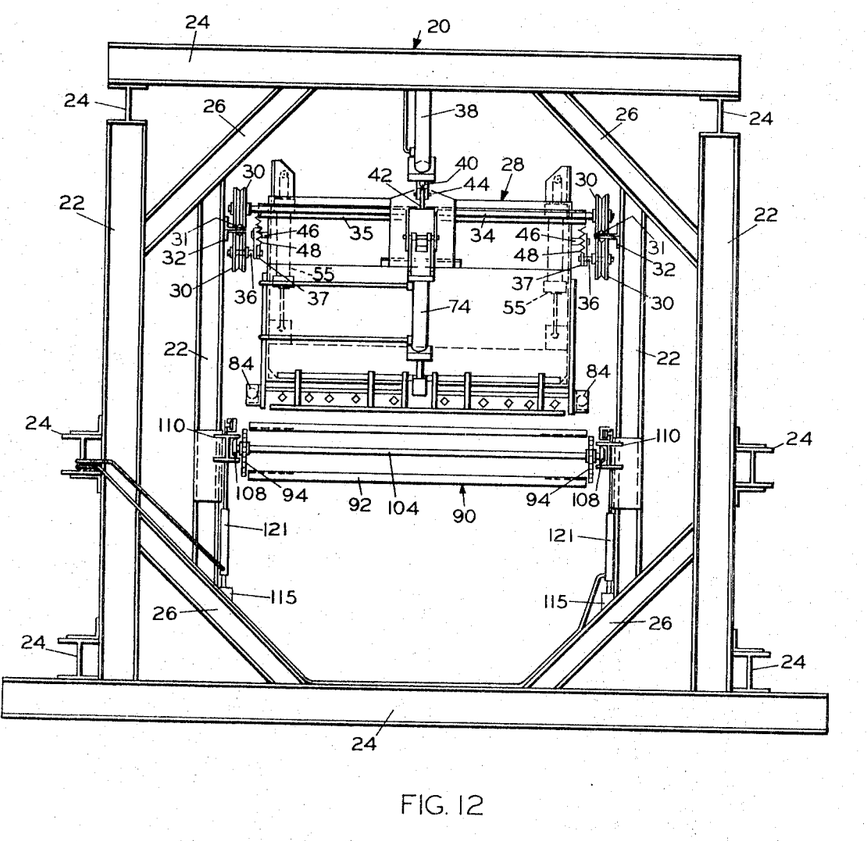
FIG. 12 is a rear elevational view of the brick laying apparatus of the present invention.
Figure 13:
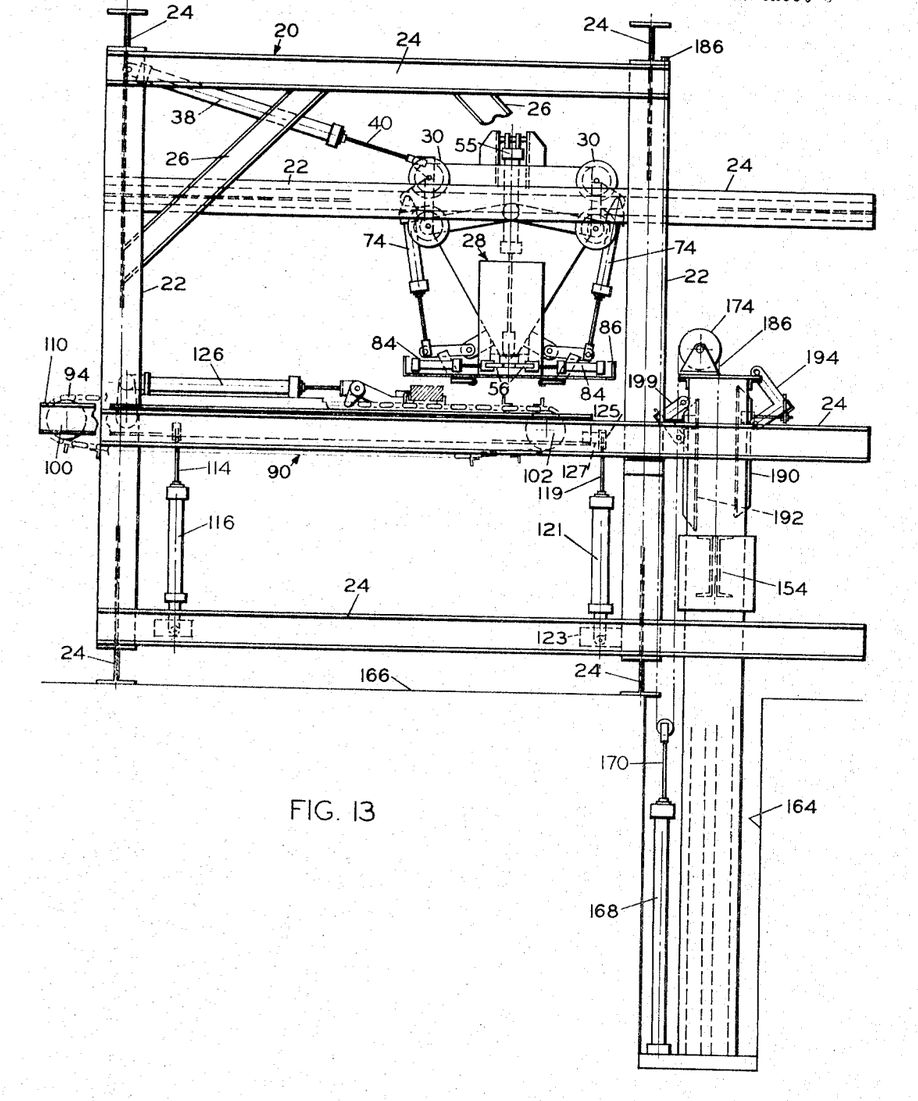
FIG. 13 is a side elevational view of the brick laying apparatus shown in FIG. 12.
Figure 14:
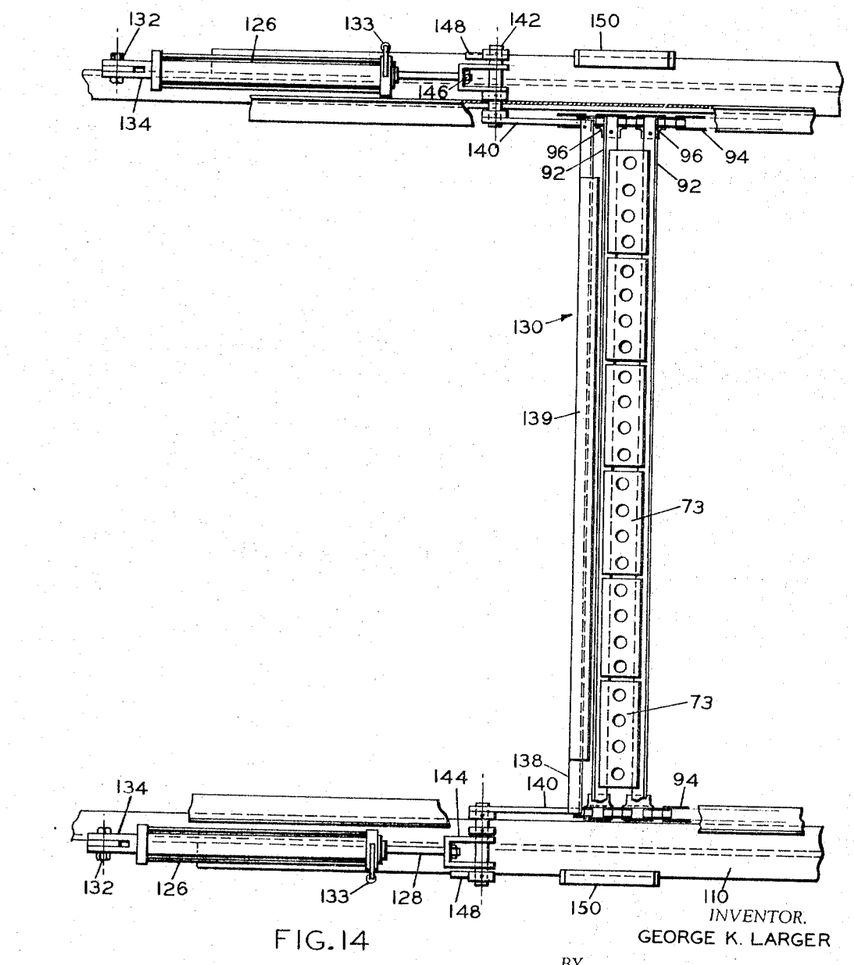
FIG. 14 is a partial top view of the conveyor means comprising a portion of the apparatus shown in FIG. 12 illustrating the means for actuating the forward movement of the conveyor means.
Figure 15:
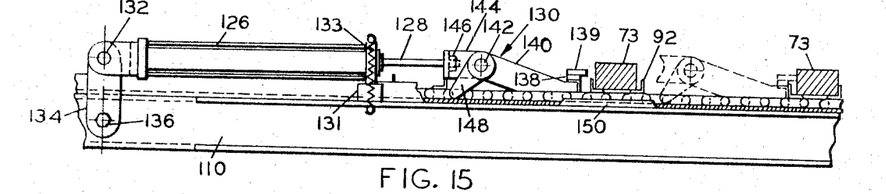
FIG. 15 is a partial side elevational view of that portion of the conveyor means shown in FIG. 14.

Referring in detail to the drawings, an apparatus for laying masonry units constructed in accordance with the present invention is illustrated in FIGS. 12 and 13 and includes a supporting frame means indicated generally at 20, formed by a plurality of I-beams including vertically extending beams 22, horizontally extending beams 24, and angularly extending beams 26. Beams 22, 24, and 26 may be connected by any conventional fastening means such as bolts, for example.

Figures 1, 1A, 2, 2A:
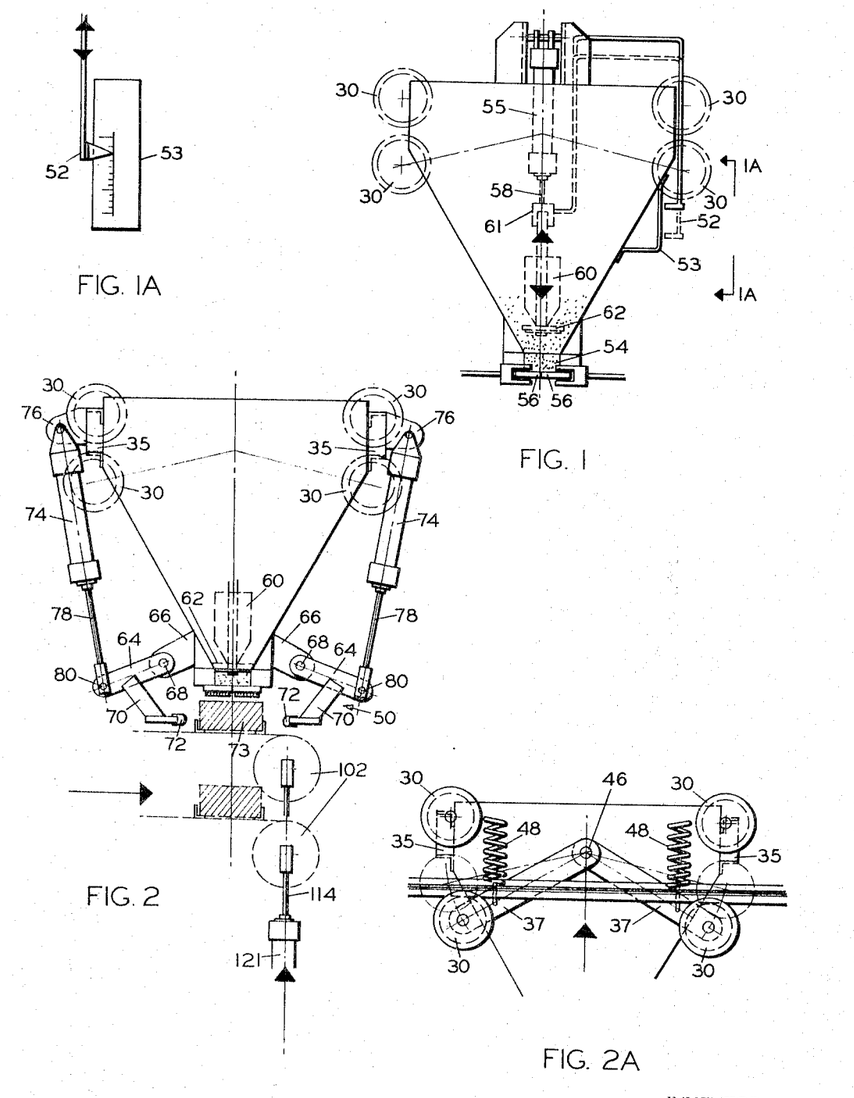
Figure 3:
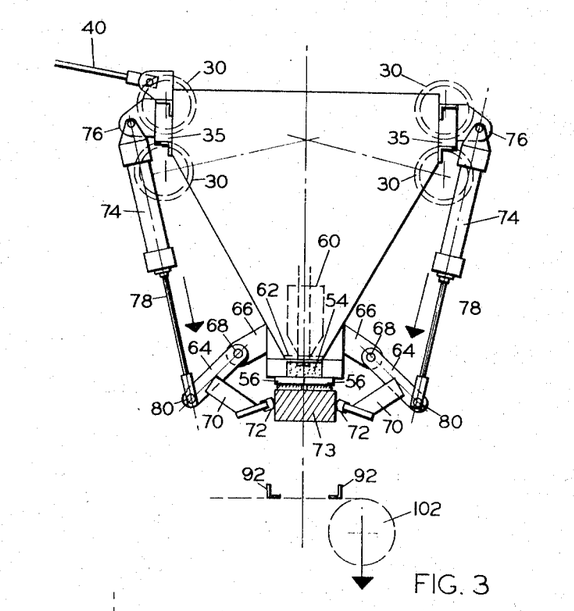
FIG. 3 is a view similar to the view shown in FIG. 2 but illustrating the engagement means in a loading or pick-up position wherein the bricks are removed from a conveyor.
Figure 4:
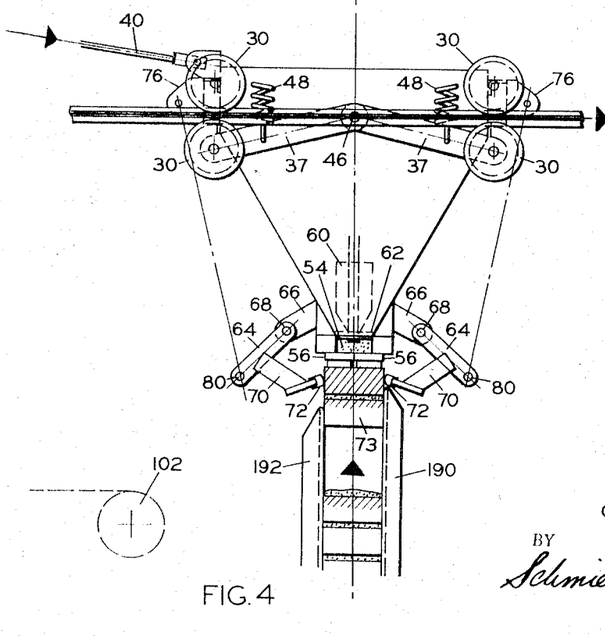
FIG. 4 is a view similar to the view shown in FIG. 3 but illustrating the hopper moved to the brick-laying position wherein the bricks carried by the engagement means are positioned on the elevating platform.

Referring now to FIGS. 2–A, 12 and 13, a hopper, indicated generally at 28, is movably mounted on frame means 20 by four pairs of rollers 30 which ride on tracks 31 formed by inverted angles welded to T-beams 32 which in turn are fastened to a pair of vertical beams 22. A power cylinder 38 and piston 40 is connected to a flange 42 on hopper 28 by a rod connector 41 and pin 44. Extension and retraction of piston 40 therefore moves hopper 28 back and forth along tracks 31.

The upper four rollers 30 are connected to shafts 34 which are rotatably mounted in hollow bracket members 35 which are connected to the front and rear of hopper 28. The lower four rollers 30 are rotatably mounted on stub shafts 36 which are fastened to arms 37 which in turn are pivotally mounted on hopper 28 at pivot pin 46. A pair of coiled springs 48 connected between arms 37 and hopper 28, as best seen in FIGS. 2–A, bias arms 37 and lower rollers 30 to engage tracks 31 at all times. In this manner hopper 28 is movably mounted in what may be referred to as "floating" engagement with tracks 31 which is very important during the operation of the apparatus as will be described later herein.

Now referring to FIGS. 1 through 7, hopper 28 is provided with masonry unit engagement means or clamps, indicated generally at 50, a measuring gauge indicator 52, an outlet 54 and sliding doors 56 which cover outlet 54. Within hopper 28 is mounted means for delivering mortar through outlet 54 in the form of power cylinders 55 and pistons 58 which are operatively connected to a plunger 60. Plunger 60 is provided with a resilient end portion 62 preferably made of rubber or the like and is connected to pistons 58 by a rod connector or clevis 61. Indicator 52 is also connected to rod connector 61 and therefore moves relative to the movement of pistons 58 and plunger 60. A gauge 53 is fastened on the front of hopper 28 and provided with appropriate markings that indicate the position of plunger 60 to the operator.

Engagement means 50 include a pair of arms 64 pivotally mounted to outwardly extending flanges 66 at pivot pin 68. A clamp portion 70 is rigidly fastened intermediate the ends of each arm 64 and is provided with an edge covered by a resilient material 72, such as rubber, for example, to prevent damage to masonry units such as bricks 73 which are to be engaged. Power cylinders 74 are connected to flanges 76 provided on hopper 28 and the pistons 78 of the respective cylinders 74 are pivotally mounted to one end of a respective arm 64 at pivot pins 80.

Figures 5, 6, 7:
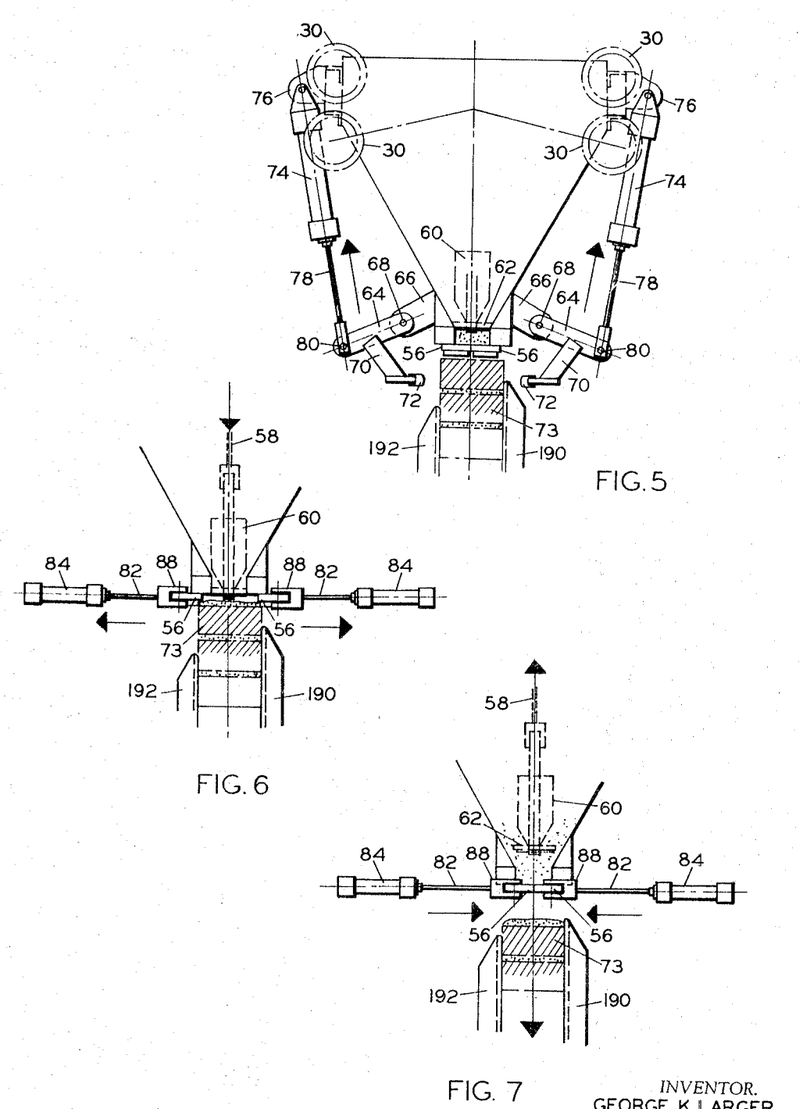
FIG. 5 is a view similar to the view shown in FIG. 4 but illustrating the engagement means in an open position after the bricks have been deposited on the receiving platform.
FIG. 6 is a partial view of the lower portion of the hopper as seen in FIG. 5 and includes the piston means which operate the doors of the hopper outlet, the doors being illustrated in an open position.
FIG. 7 is a view similar to the view shown in FIG. 6 but illustrating the doors of the hopper in a closed position.

Now referring specifically to FIGS. 6 and 7, and 13 doors 56 are attached to horizontally mounted pistons 82 of power cylinders 84 which are mounted on an angle 86 welded to hopper 28. The inner ends of pistons 82 are fastened to U-shaped connecting members 88 which in turn are fastened to doors 56. Retraction of piston 82 moves doors 56 away from each other to the open position illustrated in FIG. 6 and extension of pistons 82, it will be understood, close doors 56 as illustrated in FIG. 7.

Now referring to FIGS. 12 through 19, a conveyor means, indicated generally at 90, moves the masonry units toward a pick-up or loading station which is the point where the previously described engagement means 50 engages the bricks. The loading station also represents the farthest point of travel of hopper 28 on tracks 31 in a rearward direction or to the left as seen in FIG. 13.

Conveyor means 90 comprises a plurality of beds each being formed by a pair of horizontally extending, confronting angles 92. Each pair of confronting angles 92 are fastened in spaced relationship along chains 94. A plurality of bracket flanges 96 are connected in spaced relationship to chains 94 and each angle 92 is bolted to a respective bracket flange 96 by a bolt 98, as best seen in FIGS. 16 and 17.

Chains 94 are mounted on two pairs of sprockets 100 and 102 which in turn are mounted on rotatable shafts 104. Shafts 104 are rotatably mounted in bearing members 108 which are connected to longitudinally extending I-beams 110, FIG. 12.

Figure 17:
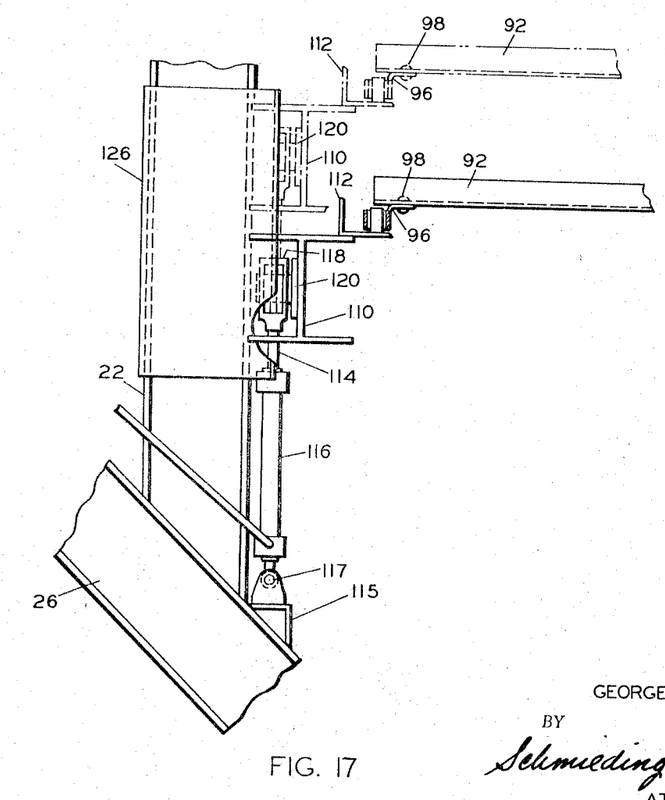
FIG. 17 is a partial rear elevational view of that portion of the conveyor means shown in FIG. 16 illustrating the power cylinder and piston employed for adjusting the height of said conveyor means.

As best seen in FIG. 17, chains 94 are supported by an angle 112 welded to the top portion of each I-beam 110.

Figure 16:
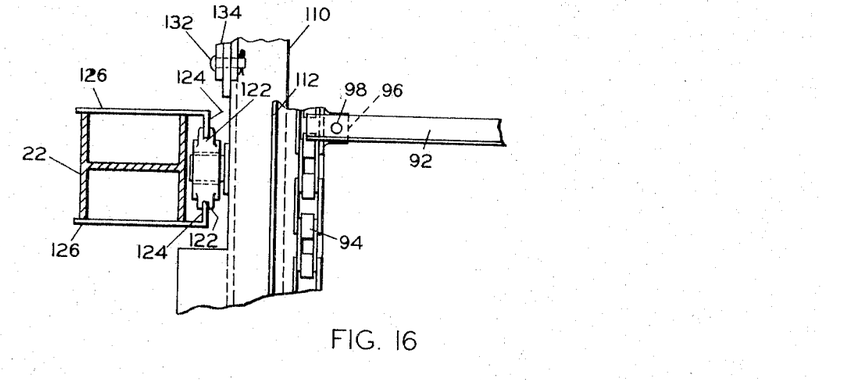
FIG. 16 is a partial top view of another portion of the conveyor means shown in FIG. 12.

With continued reference to FIGS. 16 and 17, the rear portion of each I-beam 110 is mounted on a piston rod 114 of power cylinders 116 each of which in turn are mounted to a mounting bracket 115 at pin connector 117. Mounting brackets 115 are welded to angular beams 26 disposed toward the rearward end of conveyor means 90.

A rod connector 118 is fastened to piston rod 114 and also is connected to a stud 120 one end of which extends through and is welded in a bore in connector 118. The other end of stud 120 is rigidly fastened to I-beam 110.

Rod connectors 118 include slots 122 which receive turned-in portions 124 of a pair of plates 126 welded to vertical I-beams 22. Portions 124 form a track or guide means upon which connectors 118 may slide vertically.

The front portion of each I-beam 110 is also mounted on a pair of pistons 119 of power cylinders 121. Power cylinders 121 are connected in a conventional manner to a mounting flange 123 provided on the front portion of frame means 20. Pistons 119 are connected to I-beams 110 in a conventional manner by rod connectors 125 which are fastened to plates 127.

In this manner it will be understood that conveyor means 90 move vertically upon extension and retraction of piston rods 114 in power cylinders 116 and pistons 119 in cylinders 121.

It is desirable to stabilize the forward end of conveyor means 90 against lateral sway and therefore some type of guide means, not shown, such as a bracket attached to each side of frame means 20 but not attached to I-beams 110 may be used to confine lateral movement of the forward end.

Now referring to FIGS. 13, 14, 15, 18 and 19, conveyor means 90 is advanced by means of a pair of power cylinders 126 and piston rods 128 which drive conveyor actuating means, indicated generally at 130. The rearward end of each power cylinder 126 is connected by a bolt 132 to a bracket 134 which in turn is bolted to a respective I-beam 110 by another bolt 136. The forward ends of cylinders 126 rest on a mount 131 and are biased downwardly by springs 133 connected between cylinders 126 and beams 110. Actuating means 130 comprise a longitudinally extending push bar 138 welded at its outer ends to the forward end of a pair of links 140. Each link 140 is mounted on the inner end of a shaft 142 which is rotatably mounted throuh generally U-shaped rod connectors 144, which in turn are fastened to the threaded end of respective piston rods 128 by nuts 146.

Figure 18:
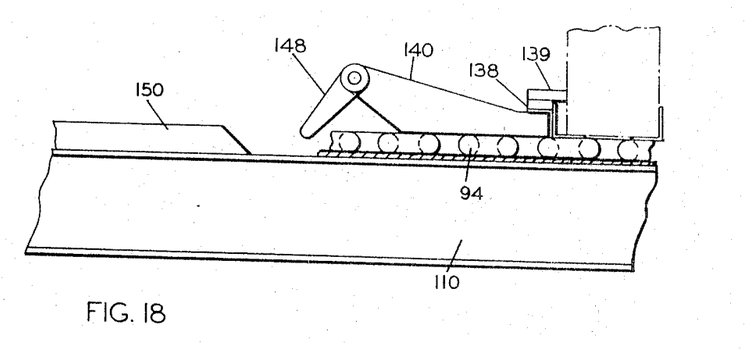
FIG. 18 is a partial side elevational view of a portion of the conveyor means shown in FIG. 15 illustrating the push bar which forms a portion of the actuating means for the conveyor means at a position representing the farthest extent of its travel toward the forward end of the apparatus.

Downwardly inclined lever bars 148 are fixedly fastened to the outer ends of shafts 142 and function to cause shafts 142 to rotate upon return of pistons 128 from the fully extended position seen in FIG. 18.. As pistons 128 retract from the position seen in FIG. 18, lever bars 148 engage upraised blocks 150 which are rigidly fastened to the top of I-beams 110. Shafts 142 are then forced to rotate by the engagement of lever bars 148 with blocks 150 to cause push bar 138 to rotate to the positions illustrated by the broken lines in FIG. 19. It will be understood that upon forward travel on extension of piston rod 128 no rotation occurs, because of the direction of inclination of lever bars 148. However, the forward ends of cylinders 126 do rise against the biasing force of spring 133 when arm 148 is riding along the top surface of block 150 upon both forward and rearward travel of piston rod 128.

Push bar 138 is provided with an extension 139 which extends along its length and protrudes forwardly to engage the bricks 73 which are being advanced. Extension 139 serves to force bricks 73 into engagement with the forwardmost angle 92 of each bed aligning the leading edge of the units in the bed with the forward edge of angle 92. In this manner a constant position of the leading edge of the unit is maintained for units of different width. It is desirable to maintain a constant point of reference for the position of the units on the bed when they approach the pick-up station and are to be clamped by engagement means 50 in order to center the units to be engaged between clamps 72.

Figure 19:
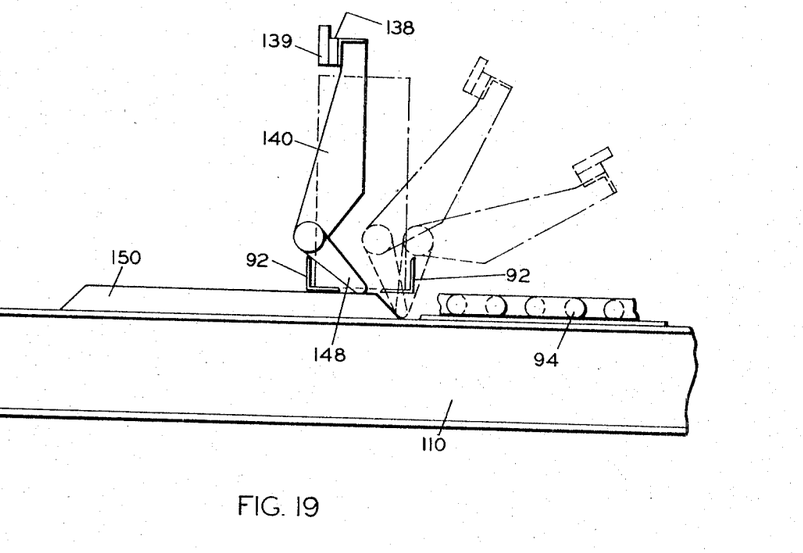
FIG. 19 is a view similar to the view shown in FIG. 18 but illustrates the push bar in various positions of rotation as it is moved toward the initial position shown in full lines in FIG. 15.

The rotation of push bar 138, upon return of piston rod 128, as seen in FIG. 19, provides clearance between bar 138 and the next bed 92 containing masonry units.

Figures 8, 9, 10, 11:
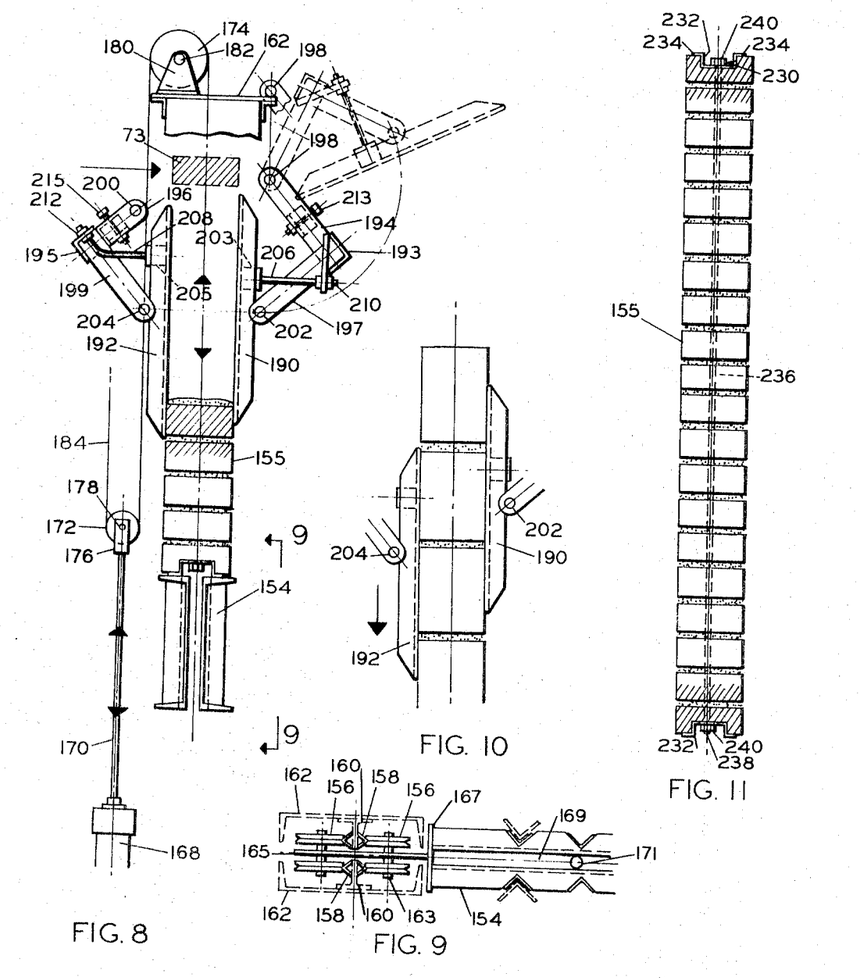
FIG. 8 is a partial side elevational view of another portion of the present invention illustrating the elevating platform upon which the bricks and blocks are laid.
FIG. 9 is a partial top view of the elevating platform shown in FIG. 8.
FIG. 10 is a partial side elevational view of the adjustable masonry unit guides positioned above the elevating platform shown in FIG. 8 and illustrates a load of cement blocks deposited on the elevating platform instead of conventional bricks.
FIG. 11 is a side elevational view of a completed wall section formed by the brick laying apparatus of the present invention.

Now referring to FIGS. 4, 8 through 10, and 13, an elevating platform 154 is disposed at the forward end of the brick laying apparatus of the present invention and forms the station where the units are laid to form the wall panel 155 illustrated in FIG. 11.

Elevating platform 154 is movably mounted by means of a plurality of rollers 156 which roll along vertical guides or tracks 158 formed by inverted angles. Guides 158 are welded to T-beams 160 which in turn are welded to a column beam 162, FIG. 9. Each pair of rollers 156 is rotatably mounted on a shaft 163 which in turn is fastened to a plate 165 which is welded to another plate 167. Plate 167 is in turn welded to the end of elevating platform 154. The other end of platform 154 is mounted in an identical manner. Beams 162 may be supported by anchoring them to the floor in any conventional manner or by connection to the horizontal I-beams 24. Beams 162 are disposed in a recess or elevator shaft 164 provided in main floor 166 but it is important to point out that frame means 20 may be constructed so that hopper 28 is higher than shown which would enable beams 162 to be placed on main floor 166 without departing from the spirit of the present invention.

Elevator 154 includes a central opening 169 and a rod guide 171, the function of which will be described later herein.

A pair of power cylinders 168 and pistons 170 and a pulley assembly comprising pulleys 172 and 174 function to raise and lower elevating platform 154. Each cylinder 168 is firmly anchored in the bottom of elevator shaft 164 behind beams 162 and pistons 170 are fastened to pulleys 172 by rod connectors 176 and pins 178. Pulleys 174 are rotatably mounted on a bracket 180 by a bearing pin 182, brackets 180 being welded to a respective column beam 162.

Pulley lines or chains 184 are fastened at one end to the frame 20 as at 186 and extend under a respective pulley 172 and over a respective pulley 174 and may be operatively fastened to an end of platform 154 or to plate 165 in any conventional manner, not shown.

Figure 21:
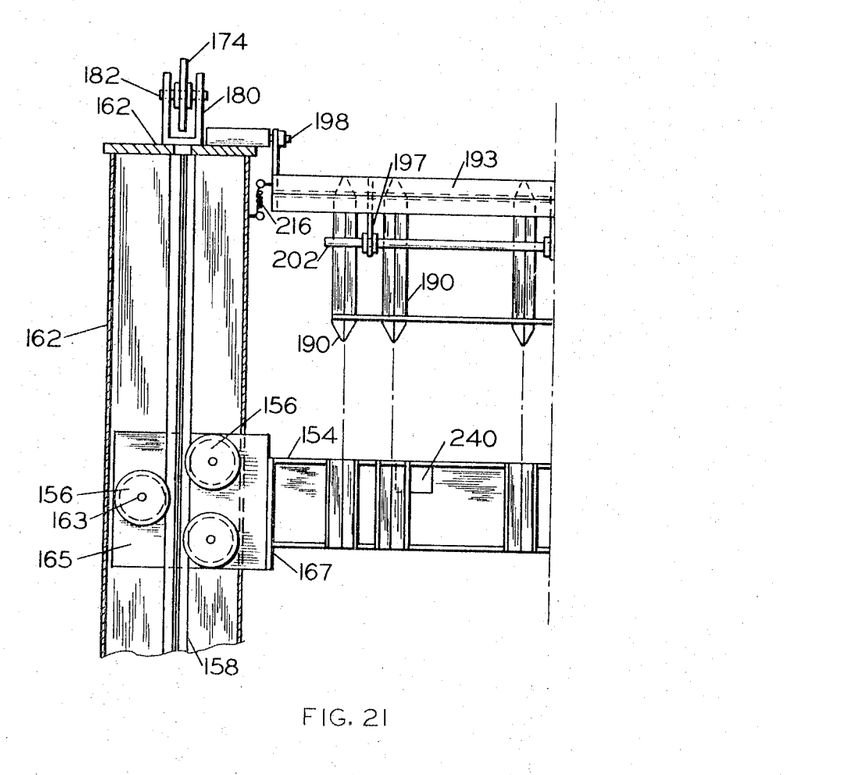
FIG. 21 is a partial front view of the elevating platform and the masonry units guide means shown in FIG. 8.

Now referring to FIGS. 8 and 21, front and rear panel guides 190 and 192 are provided to align the units to be laid in plumb on elevating platform 154.

Guides 190 and 192 are mounted by means of links 194 and 196 which are pivotally mounted to column beams 162 at pivots 198 and 200.

Angles 193 and 195 extend the entire width of guides 190 and 192 and are welded to links 194 and 196 and to supporting members 197 and 199 which in turn are rigidly fastened to rods 202 and 204.

A pair of studs 206 and 208 are welded at their inner ends 203 and 205 respectively to guides 190 and 192 and are fastened at their outer ends to links 194 and 196 by nuts 210 and 212.

Guides 190 and 192 are therefore constructed to pivot about pivots 198 and 200 as illustrated in broken lines in FIG. 8. However, to restrain this pivoting action, springs 216 are provided which are connected between links 194 and 196 and column beams 162 to bias guides 190 and 192 toward the full-lines position of FIG. 8.

It will now be understood that the distance between panel guides 190 and 192 is adjustable to permit either bricks or cement blocks to be laid by the same apparatus by simply pivoting links 194 and 196 about pivot pins 198 and 200 to swing guides 190 and 192 away from each other. The correct plumb may be adjusted by manipulation of threaded screws 213 and 215 which have inner ends abutting against column beams 162.

It is important to point out that the inner portions of guides 190 and 192 are shaped to form a relatively narrow edge so as not to smear the freshly applied mortar on the units.

Figure 20:
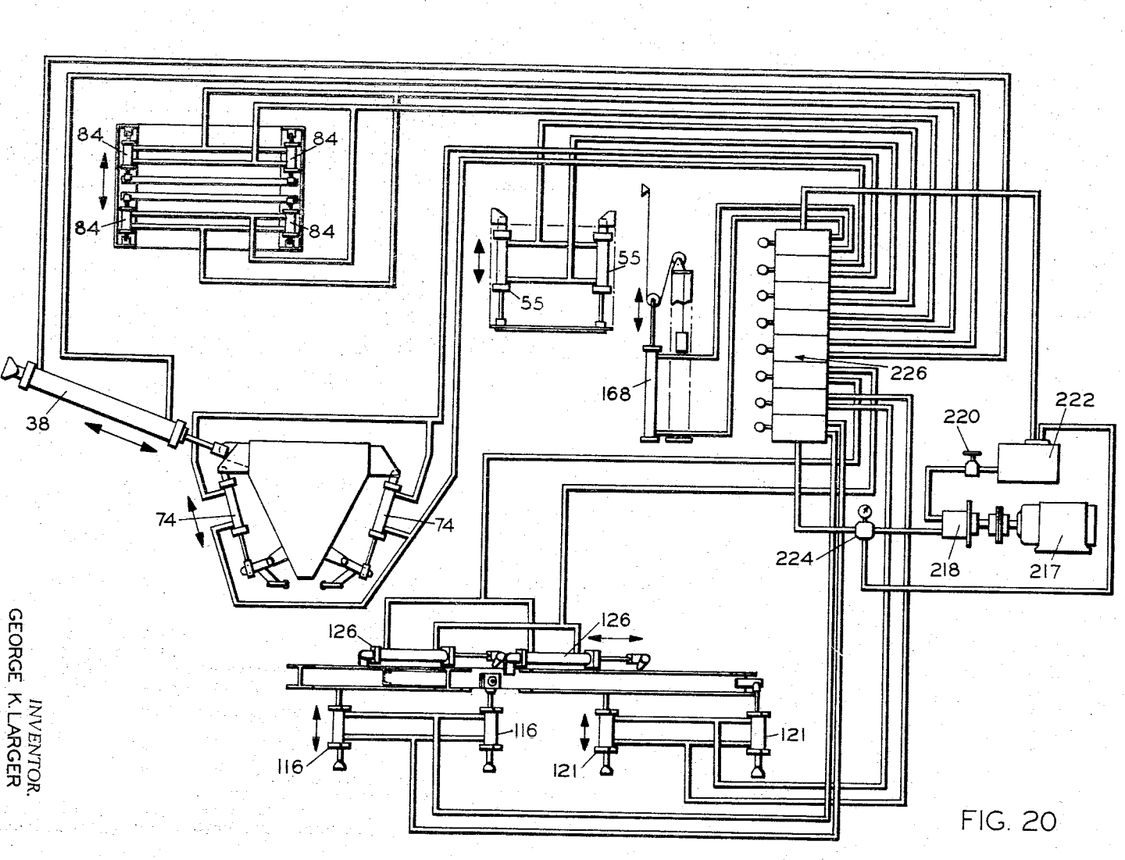
FIG. 20 is a diagrammatic view of the hydraulic power system of the apparatus of the present invention.

Now referring to FIG. 20, a typical hydraulic control system for the apparatus of the present invention is diagrammatically illustrated and is of conventional construction and by itself forms no part of the present invention and therefore for purposes of simplification it will be described in only a general manner.

A conventional electrical motor 217 functions as the prime mover for pump 218.

A main shut-off valve 220 is disposed between pump 218 and reservoir 222. A safety valve 224 is provided between pump 218 and a control panel indicated generally at 226.

Control panel 226 is provided with a plurality of manually operated levers which open and close the lines leading to the various hydraulic cylinders.

The various cylinders and those portions of the apparatus which have been previously described are indicated by the identical reference numerals.

It is important to point out that it is necessary to provide substantially equal pressure to each cylinder which functions on the opposite ends or sides of the respective movable portions to insure parallel movement of each of those portions, for example such as cylinders 126 or cylinders 168.

In operation, the brick-laying apparatus is preferably operated by two persons, one person operating the levers of control panel 226 and the other feeding the conveyor means 90 with the bricks or cement blocks to be laid. However, automatic equipment could be used if desired without departing from the spirit of the present invention.

First the bricks to be laid are loaded in each bed formed by a pair of angles 92 beginning with the rearwardmost bed. After the first bed is loaded, the appropriate control lever is actuated to activate cylinders 126 of conveyor means 90. The first load of bricks which will form the lowermost course, it is important to point out, is provided with a recess 230 as is the last load which forms the top course, FIG. 11. When the first load of bricks reaches the forward end of conveyor means 90, the operator then activates cylinder 38 to move hopper 28 rearwardly, or to the left as viewed in FIG. 13, and into alignment directly above the load of bricks.

Then cylinders 74 are activated to close clamps 72 of engagement means 50 into engagement with the load of bricks 73 as best seen in FIG. 2. Cylinders 116 and 121 are next activated to lower conveyor means 90 away from engagement means 50 and then hopper 28 may be moved forward upon extension of piston 40 of cylinder 38 to a position directly above elevating platform 154.

It is important to point out that a steel U-shaped member 232, FIG. 11, is placed upon elevating platform 154 before the first load of bricks 73 is deposited. Steel support 232 is provided with out-turned flange portion 234 and its function will be disclosed later herein.

Elevator 154 is then raised by actuation of cylinders 168 until the first load of bricks 73 rest upon steel support 232.

Here the importance of the "floating engagement" of rollers 30 becomes very apparent. If the operator raises elevator 154 too far, rollers 30 could be forced off tracks 31 or the units 73 could be damaged. However, since the lower rollers 30 are spring biased, hopper 28 may move upwardly and upper rollers 30 may actually become disengaged from tracks 31 but lower rollers 30 always maintain engagement with tracks 31. Therefore, the operator has a margin of error when raising platform 154 to a position under the units held by engagement means 50 and there is no danger of damaging the units or worse disengaging hopper 28 from tracks 31.

Now, a predetermined amount of mortar is delivered from hopper 28 by first opening doors 56 by actuation of cylinders 84 and then actuation of cylinders 55 which force plunger 60 downwardly, as best seen in FIG. 6. The desired amount of mortar is controlled by the initial height of plunger 60 which is indicated on gauge 53 by indicator 52. Indicator 52 is directly connected to pistons 58 and therefore the operator stops the travel of pistons 58 according to the position of indicator 52 with respect to gauge 53.

It is important to point out that the resilient tip 62 of plunger 60 is slightly larger than outlet 54, therefore tip 62 not only functions to push mortar out of outlet 54, but also acts as a seal to permit only the desired amount of mortar to escape.

After the mortar is delivered elevating platform 154 is lowered and pistons 58 are retracted again with the operator noting the position of indicator 52 which permits one to stop the upward travel of plunger 60 at the proper position to again deliver the proper amount of mortar. Then doors 56 are closed by the extension of pistons 82 of cylinders 84.

Next cylinders 116 and 121 are again actuated to raise conveyor means 90 to the original starting position and cylinders 126 are actuated to advance another load to the loading position and the operation just described is repeated.

Preferably, after one or two courses are laid on platform 154, a pair of supporting rods 236 are extended through aligned bores which are provided in conventional masonry units, FIG. 11.

Rods 236 are provided with threaded ends 238 and extend downwardly through rod guides 171 in opening 169 of elevating platform 154.

Ends 238 are extended through bores provided in U-shaped members 232 and are fastened by nuts 240. Access to the lower ends 238 is provided by a slot or cut-out portion 240 in elevator 154, FIG. 21.

Rods 236 are not bolted until the panel is completed, but remain in position in rod guides 171 while resting on the bottom of shaft 164. When the panel is completed, platform 154 is raised and rods 236 are manually extended upwardly through the bores in the units and fastened as described above.

The upper ends 238 of rods 236 are similarly connected to the top U-shaped member 232.

After a wall panel is completed any conventional type of lifting apparatus such as a power hoist may be used to remove the panel. A chain of proper dimensions may be slipped over the upper ends of rods 232 and nuts 240 screwed on to fasten a link to said rods. Then the freshly laid panel may be removed for any finishing processes to be completed.

It is important to point out that various sizes of masonry units can be laid by the apparatus of the present invention because of the adjustable features described herein.

For example, cement blocks are much higher than ordinary bricks, but when engaged by engagement means 50, conveyor means 90 is mounted to move downwardly a sufficient distance to provide clearance to enable hopper 28 to move forwardly without interference.

Further, panel guides 190 may be moved apart and adjusted in plumb when wider units, such as cement blocks, are being used.

While the form of embodiment of the present invention as herein disclosed constitutes a preferred form, it is to be understood that other forms might be adopted, all coming within the scope of the claims which follow.

I claim:

1. An apparatus for laying masonry units comprising, in combination, frame means; a vertically movable platform disposed adjacent to one end of said frame for receiving the units to be laid; conveyor means disposed adjacent to the other end of said frame means for delivering said units to be laid to a predetermined loading position; a hopper for holding a supply of mortar, said hopper being movably mounted on said frame means for travel between said loading position and said platform and including an outlet and means for delivering a predetermined amount of mortar from said outlet; and engagement means attached to said hopper and being releasably engageable with the units on said conveyor means for transporting said units from said conveyor means to said platform.

2. The apparatus defined in claim 1 including means for varying the vertical distance between said engagement means and said conveyor means.

3. The apparatus defined in claim 1 wherein said means for delivering a predetermined amount of mortar from said outlet includes a vertically movable plunger provided with a resilient lower edge portion, said edge portion being larger than said outlet.

4. An apparatus for laying masonry units comprising, in combination, frame means; a vertically movable platform disposed adjacent to one end of said frame for receiving the units to be laid; conveyor means disposed adjacent to the other end of said frame means and including a plurality of movably mounted beds for carrying a course of bricks to be laid, said beds being spaced a predetermined distance from one another; conveyor actuating means for selectively advancing each of said beds to a predetermined loading position; a hopper for holding a supply of mortar, said hopper being movably mounted on said frame means for travel between said loading position and said platform and including an outlet and means for delivering a predetermined amount of mortar from said outlet; and engagement means attached to said hopper and being releasably engageable with the units on said conveyor means for transporting said units from said conveyor means to said platform.

5. The apparatus defined in claim 4 wherein said conveyor actuating means includes a push bar selectively engageable with said beds, a shaft rigidly connected to said push bar, a pivot arm connected to said shaft at one end and pivotably mounted to a power piston at the other end, and a lever arm fastened to each end of said shaft, said lever arm engageable with a pivot block mounted on said frame means.

6. An apparatus for laying masonry units comprising, in combination, frame means; a vertically movable platform disposed adjacent to one end of said frame for receiving the units to be laid; adjustable guide means disposed in vertical alignment with the path of travel of said vertically movable platform for aligning each course of bricks deposited on said platform in plumb; conveyor means disposed adjacent to the other end of said frame means for delivering said units to be laid to a predetermined loading position; a hopper for holding a supply of mortar, said hopper being movably mounted on said frame means for travel between said loading position and said platform and including an outlet and means for delivering a predetermined amount of mortar from said outlet; and engagement means attached to said hopper and being releasably engageable with the units on said conveyor means for transporting said units from said conveyor means to said platform.

7. An apparatus for laying masonry units comprising, in combination, frame means; a vertically movable platform disposed adjacent to one end of said frame for receiving the units to be laid; conveyor means disposed adjacent to the other end of said frame means for delivering said units to be laid to a predetermined loading position; a hopper for holding a supply of mortar and including an outlet and means for delivering a predetermined amount of mortar from said outlet; means for movably mounting said hopper on said frame means for travel between said loading position and said platform and including upper roller means rotatably mounted on said hopper and in rolling engagement with an upper portion of a track formed on said frame means and lower roller means rotatably mounted on said hopper and being spring biased in rolling engagement with the underside of said track portion; and engagement means attached to said hopper and being releasably engageable with the units on said conveyor means for transporting said units from said conveyor means to said platform.

8. The apparatus defined in claim 7 including means for raising and lowering said conveyor means with respect to the position of said engagement means.

9. An apparatus for laying masonry units comprising, in combination, frame means; a vertically movable platform disposed adjacent to one end of said frame for receiving the units to be laid; adjustable guide means disposed in vertical alignment with the path of travel of said vertically movable platform for aligning each course of bricks deposited on said platform in plumb; conveyor means disposed adjacent to the other end of said frame means for delivering said units to be laid to a predetermined loading position; a hopper for holding a supply of mortar and including an outlet and means for delivering a predetermined amount of mortar from said outlet; means for movably mounting said hopper on said frame means for travel between said loading position and said platform and including upper roller means rotatably mounted on said hopper and in rolling engagement with an upper portion of a track formed on said frame means and lower roller means rotatably mounted on said hopper and being spring biased in rolling engagement with the underside of said track portion; and engagement means attached to said hopper and being releasably engageable with the units on said conveyor means for transporting said units from said conveyor means to said platform.

10. The apparatus defined in claim 9 including means for raising and lowering said conveyor means with respect to the position of said engagement means.

11. An apparatus for laying masonry units comprising, in combination, frame means; a vertically movable platform disposed adjacent to one end of said frame for receiving the unit to be laid, said platform including a slot intermediate its ends and extending from top to bottom for receiving a reinforcing rod; conveyor means disposed adjacent to the other end of said frame means for delivering said units to be laid to a predetermined loading position; a hopper for holding a supply of mortar, said hopper being movably mounted on said frame means for travel between said loading position and said platform and including an outlet and means for delivering a predetermined amount of mortar from said outlet; and engagement means attached to said hopper and being releasably engageable with the units on said conveyor means for transporting said units from said conveyor means to said platform.

References Cited

UNITED STATES PATENTS

| | | | |
|---|---|---|---|
| 1,736,812 | 11/1929 | Youngblood | 52—749 |
| 1,818,741 | 8/1931 | Palatini | 52—749 |
| 2,141,397 | 12/1938 | Locke | 52—744 |
| 3,039,233 | 6/1962 | Holmes | 52—749 |
| 3,177,621 | 4/1965 | Demarest | 52—749 |
| 3,236,924 | 2/1966 | McClarney et al. | 52—744 |

FOREIGN PATENTS

| | | |
|---|---|---|
| 692,502 | 6/1953 | Great Britain. |

FRANCIS K. ZUGEL, *Primary Examiner.*